May 22, 1945.   C. L. THOMPSON   2,376,636
RETRACTABLE AUXILIARY WING FOR AIRPLANES
Filed Jan. 19, 1943
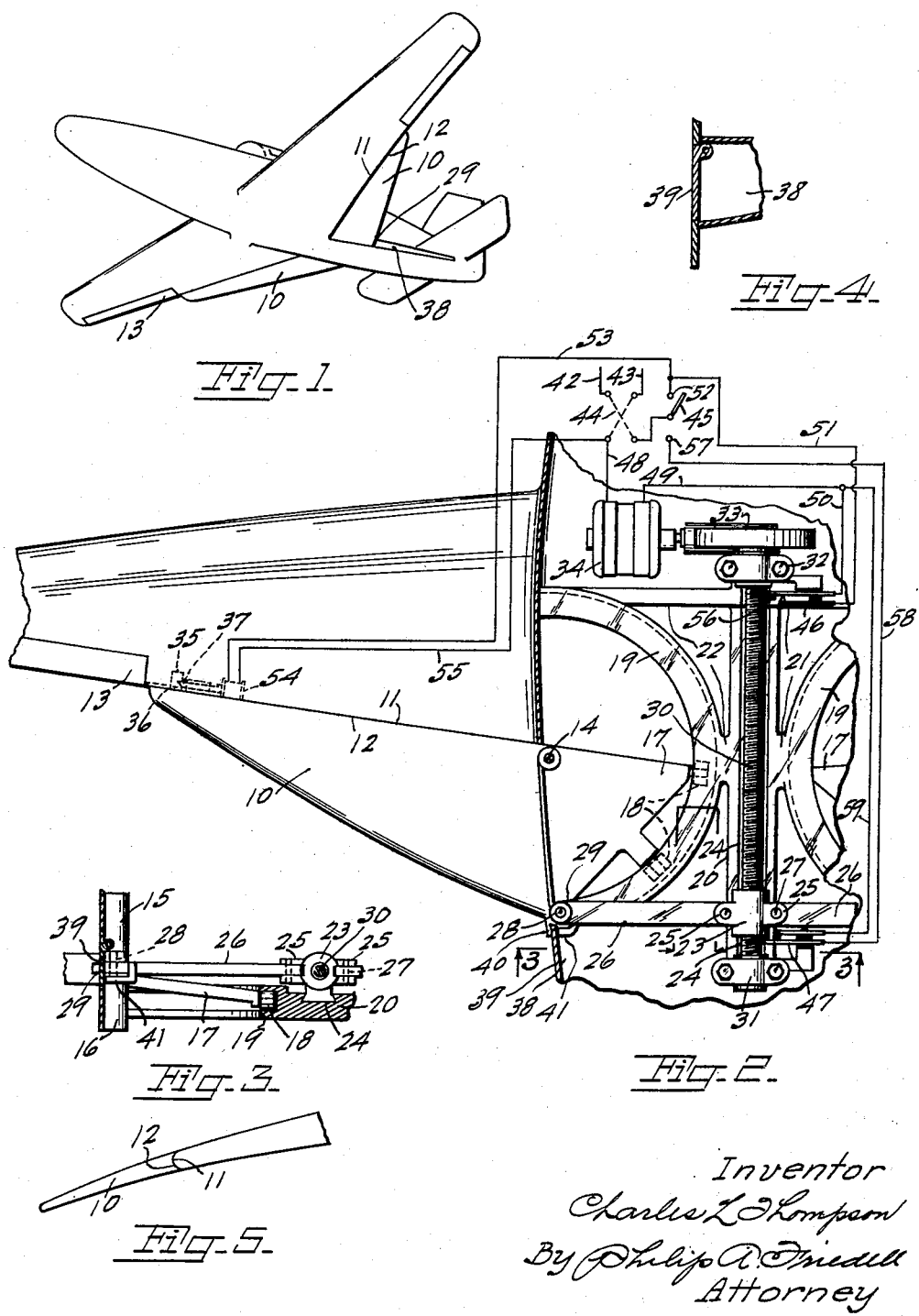
Inventor
Charles L Thompson
By Philip A. Friedell
Attorney Patented May 22, 1945

2,376,636

UNITED STATES PATENT OFFICE 2,376,636

RETRACTABLE AUXILIARY WING FOR AIRPLANES

Charles L. Thompson, Oakland, Calif.

Application January 19, 1943, Serial No. 472,902

15 Claims. (Cl. 244—43)

This invention, a retractable auxiliary wing for airplanes is designed to provide ample lifting power at take-off with heavy loads and for trimming of the wing area after the plane has gained altitude and speed, to increase its speed and range; and for increasing the wing area for landing to reduce the length of landing field required and to reduce the air speed for landing.

The load which an airplane can carry is dependent upon the wing area and the speed of take-off which is governed by the length of landing field or runway over which the plane can accelerate. After the plane has taken off, the speed can be increased to a definite velocity at a given propeller speed, and at this velocity the wing area is usually more than sufficient to support the load. The additional wing area introduces additional air friction which limits the velocity. If the wing area is reduced after the plane has attained its normal speed, further increase in speed results with the same propeller speed, thus not only increasing the speed of the plane with its full load but proportionately increasing the range of the plane with the same amount of fuel. Therefore, with a reduced wing area, either the range can be increased with the same load and amount of fuel, or, the amount of fuel can be decreased and the load increased for the same range at increased speed.

The objects of the invention are as follows:

First, to provide a wing structure for airplanes which can be increased or reduced in area at will.

Second, to provide a retractable auxiliary wing which can be coupled to the standard wing structure for take-off and landing and which can be retracted following take-off when the plane has attained sufficient speed for support of the load with the decreased wing area; and before landing can be projected to increase the wing area for slower landing speed.

Third, to provide a wing structure which can be decreased in area at will to increase the flight range of the plane with the same amount of fuel.

Fourth, to provide a special operating mechanism of simplified design for projecting and retracting the auxiliary wing structure.

Fifth, to provide means for automatically locking and unlocking the auxiliary wing structure to and from the main wing structure when the auxiliary wing is respectively, projected or retracted.

In describing the invention reference will be made to the accompanying drawing, in which:

Fig. 1 is a perspective view of a low-wing monoplane with the invention applied thereto.

Fig. 2 is an enlarged fragmentary section through an airplane showing the retractable auxiliary wing in projected and locked position, and illustrating a simple form of operating and locking mechanism.

Fig. 3 is a vertical section taken on line 3—3 of Fig. 2, with the control switch on the bearing removed.

Fig. 4 is a sectional elevation through the closure for the auxiliary wing pocket.

Fig. 5 is a diagrammatic view showing the coupling between the trailing edge of the standard wing and the leading edge of the auxiliary wing.

The invention consists of an auxiliary wing which is in its projected position a continuation of the standard wing to provide maximum wing area for take-off to lift the maximum load, and for landing to reduce ground speed, and which continuation can be retracted at will into a suitable pocket or recess in the airplane to decrease the wing area for maximum speed, maneuverability, and range.

The retractable auxiliary wing 10 is preferably formed with a concave leading edge 11 to fit the trailing edge 12 of the standard wing, and extends outwardly any suitable distance such as to the inner end of the aileron 13, and is of such area and form as to provide maximum lift with suitable balance.

This auxiliary wing is suitably pivoted in the fuselage or body of the plane as indicated at 14, the pivot being suitably mounted in bearings 15 and 16 which are attached to the walls or other suitably fixed structure.

An arm 17 extends inwardly from the inner end of the auxiliary wing 10 and this arm has suitable roller or ball bearings 18 mounted about the periphery for operation within the semi-circular guide 19 which also is fixed to the main structure of the plane; the opposed semi-circular guides being connected together through the traveling way or gibway 20 as indicated at 21 and 22 to provide a rigid structure.

A traveling nut 23 is slidably mounted in the gibway 24 and has ears 25 in which the links 26 are pivoted as indicated at 27; the other ends of the links 26 being pivoted at 28 in the inward end 29 of the auxiliary wing.

The traveling nut 23 operates on a screw 30 the ends of which are rotatably mounted in bearings 31 and 32, and this screw is suitably operated through a suitable gear reduction 33 by a motor 34 or other suitable driving means.

Near the outer end of the auxiliary wing is a catch 35 which passes through a suitable passage 36 formed through the trailing edge of the standard wing, and a latch 37 is mounted within the main wing for engagement with this catch.

A suitable recess or pocket 38 is formed in proper position as indicated to receive the auxiliary wing when it is retracted, and a flap door 39 is designed to close this pocket when the auxiliary wing is projected to the position shown in Figs. 1 and 2. An extension 40 on the auxiliary wing opens the flap inwardly as soon as retraction of the auxiliary wing is started, and another projection 41 on the link 26 positively closes and locks the flap when the auxiliary wing is projected, thus sealing off the pocket; the flap then being secured between the projections 40 and 41.

Control and operating means for retraction and projection of the auxiliary wing is illustrated as an electric circuit, though any other suitable method or means may be used instead.

The main circuit or power line 42—43 is controlled by a reversing switch 44 to which is coupled a single pole double throw switch 45 for simultaneous operation, whereby a single control is provided. Two additional switches are provided for control by the traveling nut 23 and are illustrated as normally closed switches of the spring-urged type and in their simplest form. Switch 46 is illustrated as mounted on the bearing 32, and switch 47 as mounted on the bearing 31.

A circuit is completed to the motor through the reversing switch 44 and conductor 48, thence through the conductor 49, 50, switch 46, conductor 51 and switch 45 through contact 52 for operating the screw 30 in one direction for retracting the auxiliary wing, and, simultaneously the circuit is completed through switch 45, conductor 53, solenoid 54 and conductor 55 to switch 44; the solenoid 54 retracting the latch 37 and releasing the auxiliary wing from the main wing at the instant when the motor is cut into circuit, and because the link 26 at the instant is past dead center, no retractive effort is applied to the auxiliary wing until after the latch has been released.

The screw 30 moves the nut 23 toward the switch 46, retracting the wing, and finally the nut 23 contacts and opens the switch 46 by pressure on the switch arm 56, breaking the circuit to the motor. As the auxiliary wing closes into the pocket 38, the flap 39 is opened by the projection 40, the leading edge 11 of the wing forming a closure for the pocket when the wing is fully retracted.

When the auxiliary wing is to be projected to increase the wing area, the reversing switch 44 with switch 45 is thrown to the opposite position, with switch 45 to contact 57, which breaks the circuit to the solenoid 54 and permits the latch 37 to act freely to engage the catch 36 under the normal spring urgence of the conventional type of latch. Simultaneously the circuit is completed through switch 45, contact 57, conductor 58, through switch 47 which closed when the nut 23 moved toward the drive end, thence through conductor 59 and conductor 49 to the motor 34, thence through conductor 48, reversing switch 44 to the main line 42—43.

With this operation the nut 23 travels along the screw 30 away from the drive end with the link 26 forcing the auxiliary wing out, eventually to the position shown in Figs. 1 and 2, the catch 33 passes through the passage 36 and is engaged by the latch 37.

The arm 17 with its rollers 18 operating in the semi-circular guide 19 provides the necessary rigidity to the wing.

When a full load is to be transported, the switch 44 is closed to project the auxiliary wing which is locked by the latch 37, thus providing a greater wing area for take-off. A greater load can thus be lifted and a shorter runway is required. After the load has been taken into the air and the plane reaches its normal speed, the switch 44 is reversed together with switch 45. The latch 37 is instantly retracted to release the auxiliary wing from the main wing, and the motor starts operation of the screw to retract the nut 23 which through links 26 retracts the auxiliary wing into the recess 38, and when the wing is fully retracted, the nut breaks the circuit through the switch 46.

For landing, the operation is opposite to that just described, the auxiliary wing being projected to increase the wing area.

With the decreased wing area the speed of the plane increases with the same propeller speed due mainly to decreased air friction, without increase in fuel consumption, thereby increasing the range of the plane with its load with the same amount of fuel.

It will be understood that variations in construction and arrangement of parts, which variations are consistent with the appended claims may be resorted to without detracting from the spirit or scope of the invention, or sacrificing any of the advantages thereof.

I claim:

1. In a monoplane having a fuselage and a pair of main wings each having a trailing edge convex in cross-section; an auxiliary wing for each main wing and a recess formed in each side of said fuselage for reception of the respective auxiliary wings, each of said auxiliary wings having a leading edge concave in cross-section to fit the convex trailing edge of its co-operative main wing, and being pivotally mounted at the inner end of said leading edge to said fuselage, said auxiliary wings being rearwardly retractable within said recesses; power means and manual reversing means therefor for retracting said auxiliary wings into said recesses, and for projecting said auxiliary wings to form contact between the concave leading edges of the auxiliary wings and the convex trailing edges of the main wings to provide an uninterrupted continuation of the combined main and auxiliary wing surfaces; whereby the wing area of the monoplane may be increased or decreased at will, respectively for increased lift and increased speed.

2. In a monoplane having a fuselage and a pair of main wings having each a trailing edge; an auxiliary wing for each main wing and having a leading edge and a trailing edge and having near the inner end of the leading edge a pivotal connection to said fuselage; an enclosure formed in each side of said fuselage to receive and enclose the respective auxiliary wings when in retracted position; stabilizing and supporting means for the inner end of each auxiliary wing; power means and reversing means therefor, for projecting said auxiliary wings to contact said leading edges with the trailing edges of the main wings, and for retracting said auxiliary wings into said enclosures.

3. A structure as defined in claim 2; said stabilizing and supporting means comprising integral arms in radial relation to the pivotal connection and having each a roller mounted on a radial axis on the end thereof, and opposed circular guides comprising each upper and lower parallel members and mounted in said fuselage with their axes coincident with the axes of the pivotal connections, with the rollers operating between the parallel members and maintaining the auxiliary wings against deflection.

4. A structure as defined in claim 2; said leading edge having a cross-sectional form to fit about the trailing edge of the main wing to provide uninterrupted air flow throughout the extended surfaces of the combined main and auxiliary wings; said stabilizing and supporting means comprising integral arms extending from the inner ends of said auxiliary wings in radial relation to the pivotal connection and having each a roller mounted on a radial axis at the end thereof, and opposed circular guides comprising each upper and lower parallel members and mounted in said fuselage with their axes coincident with the axes of the pivotal connections and with the rollers operating between the parallel members for maintaining the auxiliary wings in aligning relation to the main wings.

5. A structure as defined in claim 2; a closure member for each enclosure, and means associated with each auxiliary wing and cooperatively related to the closure member for locking the closure member in closed position to provide an uninterrupted surface exteriorly of the fuselage when the auxiliary wing is projected, with the leading edge forming the closure when the auxiliary wing is retracted.

6. A structure as defined in claim 2; said leading edge having a cross-sectional form to fit about the trailing edge of the main wing to provide uninterrupted air flow throughout the extended surfaces of the combined main and auxiliary wings; said stabilizing and supporting means comprising integral arms extending from the inner ends of said auxiliary wings in radial relation to the pivotal connection and having each a roller mounted on a radial axis at the end thereof, and opposed circular guides comprising each upper and lower parallel members and mounted in said fuselage with their axes coincident with the axes of the pivotal connections and with the rollers operating between the parallel members for maintaining the auxiliary wings in aligning relation to the main wings; a closure member for each enclosure; and means associated with each auxiliary wing and cooperatively related to the closure member for locking the closure member in closed position to provide an uninterrupted surface exteriorly of the fuselage when the auxiliary wing is projected, with the leading edge forming the closure when the auxiliary wing is retracted.

7. A structure as defined in claim 2; said power means comprising a screw rotatably mounted in said fuselage between the inner ends of said auxiliary wings and having a traveling nut thereon; driving means for said screw; means for interrupting operation of said driving means when said auxiliary wings have reached either their fully projected or retracted positions; a link pivotally connecting the inner end of the trailing edge of each auxiliary wing with said nut; and means for reversing said driving means at will.

8. A structure as defined in claim 2; said stabilizing and supporting means comprising integral arms in radial relation to the pivotal connection and having each a roller mounted on a radial axis on the end thereof, and opposed circular guides comprising each upper and lower parallel members and mounted in said fuselage with their axes coincident with the axes of the pivotal connections, with the rollers operating between the parallel members and maintaining the auxiliary wings against deflection; said power means comprising a screw rotatably mounted between the opposed circular guides and having a common base therewith and having a traveling nut with opposed ears thereon; driving means for said screw; a link pivotally connecting the inner end of the trailing edge of each auxiliary wing with the respective ears; and manually controlled reversing means for said driving means.

9. A structure as defined in claim 2; said power means comprising a screw rotatably mounted between the opposed circular guides and having a common base therewith and having a traveling nut with opposed ears thereon; driving means for said screw; a link pivotally connecting the inner end of the trailing edge of each auxiliary wing with the respective ears; and manually controlled reversing means for said driving means.

10. A structure as defined in claim 2; said power means comprising a screw rotatably mounted in said fuselage centrally between the inner ends of said auxiliary wings and having a traveling nut thereon and links pivotally connecting the inner ends of the trailing edges of the auxiliary wings with said nut; a motor for driving said screw and a circuit and manually controlled reversing means therefor; said circuit including a normally closed switch mounted for cooperation with said nut at each terminal of travel to break the circuit with the circuit again completed upon reversal of said reversing means for operation of said screw in the other direction.

11. A structure as defined in claim 2; said power means comprising a screw rotatably mounted in said fuselage centrally between the inner ends of said auxiliary wings and having a traveling nut thereon, and links pivotally connecting the inner ends of the trailing edges of the auxiliary wings with said nut; a motor for driving said screw and a circuit and manually controlled reversing means therefor; said circuit including a normally closed switch for each terminal of travel and mounted for cooperation with said nut to break the circuit, with the circuit again completed through the other or closed switch upon reversal of said reversing means for operation of said screw in the other direction; cooperative latching means mounted in the trailing edge of each main wing and in the leading edge of each auxiliary wing, and electromagnetic latch releasing means and circuits therefor controlled by said reversing means to release the latches when said reversing means is in position to retract said auxiliary wings.

12. In a monoplane having a fuselage and a pair of main wings having each a trailing edge; an auxiliary wing for each main wing and having a leading edge and a trailing edge and having the inner end of the leading edge pivotally connected to said fuselage; an enclosure formed in each side of said fuselage to receive and enclose the respective auxiliary wings in their retracted positions; supporting and driving means for projecting and retracting said auxiliary wings comprising a member having opposed semi-circular tracks having upper and lower parallel surfaces and with their axes common with the pivotal connections of said auxiliary wings, and a screw in tangential relation between said tracks and rotatably mounted on a base common with said tracks, and a traveling nut having opposed ears and operating on said screw; driving means for said screw; arms integral with the inner end of each auxiliary wing and extending radially from the axis of the pivot connection, and a roller mounted on a radial axis on the end of each arm and operating between said upper and lower parallel surfaces to support and stabilize said auxiliary wings, and links pivotally connecting the respective inner ends of the trailing edges of said auxiliary wings with the opposed ears.

13. A structure as defined in claim 12; said driving means comprising a motor and a circuit therefor including a reversing switch, two normally closed switches respectively mounted for cooperation with said nut at its opposite terminals of travel to break the circuit, with the circuit again completed through the remaining closed switch through operation of said reversing switch to reverse the motor.

14. A structure as defined in claim 12; said driving means comprising a motor and a circuit therefor including a reversing switch, two normally closed switches respectively mounted for cooperation with said nut at its opposite terminals of travel to break the circuit, with the circuit again completed through the remaining closed switch through operation of said reversing switch to reverse the motor; cooperative latching means mounted in the trailing edge of each main wing and in the leading edge of each auxiliary wing, and electromagnetic latch releasing means and circuits therefor controlled by said reversing switch to release the latches when said reversing means is moved to a position to retract said auxiliary wings.

15. A structure as defined in claim 12; a closure member for each enclosure, and means associated with each auxiliary wing and cooperatively related to the closure member for locking the closure member in closed position to provide an uninterrupted surface exteriorly of the fuselage when the auxiliary wing is projected, with the leading edge forming the closure when the auxiliary wing is retracted.

CHARLES L. THOMPSON.